US007522971B2

(12) United States Patent
Brehm et al.

(10) Patent No.: US 7,522,971 B2
(45) Date of Patent: Apr. 21, 2009

(54) METHOD AND SYSTEM FOR COLLECTING AND POOLING UNQUALIFIED BATCHES OF MAIL FOR PRE-SORTING

(75) Inventors: Christopher Scott Brehm, Alpharetta, GA (US); Stanley Alan Engel, Cumming, GA (US); Michael Todd McAlpin, Alpharetta, GA (US); Sandy Lee Pittman, Alpharetta, GA (US); Joseph Clay Teate, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 198 days.

(21) Appl. No.: 11/510,381

(22) Filed: Aug. 24, 2006

(65) Prior Publication Data

US 2006/0287968 A1 Dec. 21, 2006

Related U.S. Application Data

(62) Division of application No. 10/013,105, filed on Nov. 6, 2001, now abandoned.

(51) Int. Cl.
*G06F 7/00* (2006.01)

(52) U.S. Cl. ........................ 700/219; 209/900; 209/933

(58) Field of Classification Search ................. 705/401, 705/402, 409, 410, 1, 8, 400, 406; 209/3.1, 209/584, 630, 632, 900, 933; 700/219
See application file for complete search history.

(56) References Cited

U.S. PATENT DOCUMENTS

| | | | | |
|---|---|---|---|---|
| 4,800,506 | A | 1/1989 | Axelrod et al. | |
| 4,853,869 | A | 8/1989 | Durst, Jr. et al. | |
| 4,862,386 | A | 8/1989 | Axelrod et al. | |
| 4,997,337 | A * | 3/1991 | Trimble | 414/790.4 |
| 5,042,667 | A | 8/1991 | Keough | |
| 5,051,914 | A * | 9/1991 | Sansone et al. | 700/223 |
| 5,058,030 | A | 10/1991 | Schumacher | |
| 5,060,165 | A | 10/1991 | Schumacher et al. | |

(Continued)

FOREIGN PATENT DOCUMENTS

EP 0 575 109 A1 12/1993

(Continued)

OTHER PUBLICATIONS

SBA SOP 00 10 4 Mail Management Program; 1999.*

*Primary Examiner*—Igor N Borissov
(74) *Attorney, Agent, or Firm*—Alston & Bird LLP

(57) ABSTRACT

A method and system is provided for collecting relatively small batches of mail that, alone, would not qualify for mailing at a pre-sorted postage rate and pooling them together with others for pre-sorting into a qualified batch of pre-sorted mail. The inventive method involves transporting mail in a traceable container to a holding facility where it is pooled with others for pickup and processing by a mail pre-sorting business. The mail may be metered at a reduced program rate. The system creates a cooperative of participating mail senders working together to earn a lower effective postage rate. The method further provides a solution to the technical problem of postal sorting equipment that is overburdened by medium-sized batches of unsorted mail. The solution identifies and diverts such batches for processing at a separate facility before the batch is tendered to the postal service.

7 Claims, 4 Drawing Sheets

U.S. PATENT DOCUMENTS

| | | | | | |
|---|---|---|---|---|---|
| 5,072,401 | A | * | 12/1991 | Sansone et al. | 700/219 |
| 5,161,109 | A | | 11/1992 | Keating et al. | |
| 5,377,120 | A | * | 12/1994 | Humes et al. | 700/224 |
| 5,661,653 | A | * | 8/1997 | Kulik | 705/410 |
| 5,667,078 | A | | 9/1997 | Walach | |
| 5,842,186 | A | * | 11/1998 | Kulik | 705/410 |
| 5,918,220 | A | | 6/1999 | Sansone et al. | |
| 6,167,326 | A | | 12/2000 | Graushar et al. | |
| 6,457,012 | B1 | | 9/2002 | Jatkowski | |
| 6,674,038 | B1 | * | 1/2004 | Latta | 209/584 |
| 6,816,838 | B1 | | 11/2004 | Ryan, Jr. | |

FOREIGN PATENT DOCUMENTS

| | | |
|---|---|---|
| EP | 0 778 090 A1 | 6/1997 |
| WO | PCT/US01/47095 | 9/2002 |

* cited by examiner

METHOD AND SYSTEM FOR COLLECTING AND POOLING UNQUALIFIED BATCHES OF MAIL FOR PRE-SORTING

CROSS-REFERENCE TO RELATED APPLICATIONS

This application is a divisional of U.S. application Ser. No. 10/013,105; filed Nov. 6, 2001 now abandoned , which is hereby incorporated herein in its entirety by reference.

TECHNICAL FIELD

The present invention relates generally to the field of mail handling. More particularly, the invention relates to a method and system for collecting and transporting mail in a traceable container to a holding facility where it is pooled with other such containers for pickup and processing by a mail pre-sorting facility. The invention also provides a solution to the technical problem of overburdened postal sorting equipment.

BACKGROUND OF THE INVENTION

Many government postal services, including the United States Postal Service, offer a reduced postage rate for pre-sorted mail. Pre-sorting reduces the processing burden on the postal service and speeds delivery. Postal service regulations often impose stringent standards for pre-sorted mail which are expensive and difficult to meet, especially for mail senders with fewer than several thousand mail pieces. Standards governing such characteristics as batch volume, size uniformity, destination variety, batch certification, typeface, zip code length, and bar coding, make it difficult to obtain the lowest rate for pre-sorted mail.

A mail sender may employ personnel and buy specialized equipment to pre-sort its mail, or it may use the services of a mail pre-sorting facility. Mail pre-sorting facilities stay abreast of postal regulations and offer pre-sorting services along with documentation certifying that each batch of pre-sorted mail complies with postal service regulations. Most mail pre-sorting facilities, however, only serve customers with large batches of mail; for example, greater than two thousand pieces. Low-volume customers, therefore, must perform their own sorting and regulation compliance or pay the higher postage rate. Many low-volume customers lack the technology and the personnel to pre-sort and meet the stringent postal regulations, so instead they pay the higher postage rate.

Customers with the technology, equipment, and personnel may be able to achieve the level of pre-sorting necessary to qualify for a reduced postage rate. The postal regulations typically include a list of published rates which are correlated to the degree of pre-sorting accomplished and other factors. For example, a batch of two thousand or more mail pieces, of similar weight and size, may qualify for a lower rate such as 32.2 cents instead of the first-class or full rate of 34.0 cents. To earn this kind of discount, the customer must learn and comply with the regulations and published rates of the local postal service, apply postage to each mail piece at the published rate using a postage meter to accommodate a decimal rate such as 32.2 cents, pre-sort the entire batch as required, prepare documents such as a certificate and/or a manifest certifying compliance with the applicable postal regulations, and then deliver the sorted batch to the local post office because such a batch would be too large for collection by a mail carrier.

The low-volume customer, therefore, is faced with multiple barriers to entry when seeking a reduced postage rate. From the pre-sorting task to the burden of transporting the batch to a post office, the low-volume customer is prohibited in many cases from obtaining a reduced postage rate in an economically feasible manner.

In some countries, government postal services sort incoming mail using both manual labor and sorting machines. Commercial pre-sorting, where available, reduces the processing burden on the postal service and speeds delivery. Most pre-sorting businesses, however, will only sort large batches of mail; for example, greater than two thousand pieces. Smaller batches, therefore, are often submitted directly to the postal service for sorting and delivery.

The burden of sorting these smaller batches of up to two thousand pieces creates additional expense for the postal service and causes a delay in mail delivery. Increased sorting expenses often result in higher postage rates and/or unacceptable delays in delivery. Where commercial pre-sorting is not available, the postal service must carry the burden of sorting incoming batches of all sizes.

Many postal services lack the resources to continually upgrade and install new sorting equipment. As the number and variety of incoming mail increases, the need to successfully manage and allocate sorting resources becomes more important. In some cases, a postal service depends on commercial pre-sorting to handle the very large batches of mail, while depending upon its own sorting equipment to handle the smaller batches.

Many businesses in the developing economies generate medium-sized batches of mail that are too small for commercial pre-sorting (less than two thousand pieces, for example), but yet are so large that the batch imposes a significant burden on the postal service. For example, if a few businesses each submit a batch of eighteen hundred mail pieces on a single day to be sorted, such a request may be beyond the sorting capacity of the post office. The burden caused by these medium-sized batches is a technical problem requiring an innovative solution.

Most mail senders lack the technology, equipment, and knowledge to do their own pre-sorting. Some postal services promulgate rules and regulations for pre-sorted mail that are difficult or impractical to learn and understand for the customer who only has an occasional, medium-sized batch of mail. Furthermore, many postal services require documentation such as a certificates and detailed manifests to certify compliance with the applicable postal regulations. Customers who do not pre-sort on a regular basis will be unfamiliar with the current requirements.

While some postal services publish reduced postage rates for pre-sorted mail, many government postal services only offer reduced postage rates to customers who have the knowledge and the willingness to negotiate for a lower rate. Customers with ongoing relationships with the local postal service may be able to achieve a lower rate, but customers who only seldom have a large batch of mail typically lack the resources and information to contact the postal service and obtain a lower rate. Also, customers unfamiliar with the local customs and practices typically decide to submit their medium-sized batches directly to the postal service for sorting instead of taking the time and incurring the expense associated with learning about and negotiating with the postal service.

Because of these barriers to entry for lower-volume mail senders, many government postal services face increasing demands on already-overburdened sorting equipment.

Thus, there is a need for a method and system of processing mail pieces for low-volume mail senders that earns a reduced postage rate without incurring the high costs associated with pre-sorting relatively small batches of mail.

There is a further need for a method and system for enabling low-volume mail senders to participate in a discounted-rate mail system of a local postal service.

There is a related need for a method and system to facilitate the participation of low-volume mail senders in the services offered by mail pre-sorting facilities.

A further need exists for a method and system capable of earning a lower postage rate for a batch of mail than the mail sender could earn outside such a system.

Additionally, there is a need for a solution to the technical problems experienced by the postal service when faced with the burden of sorting medium-sized batches of mail.

There is a related need for a solution to lessen the burden placed on the postal service when mail volume increases due to batches that cannot be processed by a mail pre-sorting facility.

There is a further need for a system of processing small batches of mail that fosters participation by mail senders who only need pre-sorting occasionally. There is a related need for a system of mail processing that takes advantage of published or negotiated rates for mail senders without requiring extensive and ongoing familiarity with local customs and practices.

SUMMARY OF THE INVENTION

The above and other needs are met by the present invention which, generally described, provides a system and method for collecting several unqualified batches of mail and pooling them into a large batch for pre-sorting into a qualified batch in order to earn a reduced postage rate from a postal service. The collected small batches of mail are described as unqualified because, before processing by the system, they do not qualify for a reduced postage rate.

In one aspect of the present invention, the system includes a plurality of mail senders who fill containers with unsorted mail pieces, a plurality of holding facilities to receive and gather the containers into a pool, and a pre-sorting business to receive the pool and pre-sort the mail pieces into a qualified, pre-sorted batch for mailing at a reduced rate. The system may include a plurality of pre-sorting businesses. In one embodiment, one or more of the holding facilities is part of a transport business.

In another aspect of the present invention, postage is applied to each mail piece by the sender at a program rate. The program rate is generally less than the full postage rate for unsorted mail. In one embodiment, the program rate is set by the transport business and communicated to the participating senders.

In one alternative embodiment, the pre-sorting business applies the program rate of postage to each mail piece, after which the cost of the postage applied, plus an additional fee, may be charged to the sender.

In one embodiment of the system, the transport business provides empty containers to the senders. The containers may be pre-addressed to a particular holding facility. The transport business collects containers from the senders and transports the containers to one of the holding facilities. For this service, the sender pays a transport fee for each container.

The transport fee is either a flat fee or a variable fee based on the weight of the container. In either case, the transport fee is paid in exchange for shipping one container, regardless of the number of mail pieces inside the container.

In one embodiment, the transport business ships the pool from the holding facility to the mail pre-sorting facility. Alternatively, the pre-sorting business may collect the pools from the holding facilities.

In another aspect of the system, the pre-sorting facility receives the pool of containers and sorts the mail pieces into a pre-sorted batch. The pre-sorting business officially tenders the pre-sorted batch to the postal service, along with a certificate or manifest certifying that the pre-sorted batch is qualified for mailing at an entry rate of postage. The entry rate is governed by postal regulations and is generally less than the full rate. Preferably, the entry rate is less than the program rate.

When the pre-sorting business tenders the pre-sorted batch to the postal service, the postal service pays a rebate to the pre-sorting business. The rebate represents the difference between the entry rate and the program rate, times the number of mail pieces in the pre-sorted batch.

In another aspect of the present invention, the pre-sorting business pays an agreed upon fee to the transport business in the form of a transporter rebate.

In another aspect of the invention, a transport business accomplishes a method of supplying mail pieces to one or more pre-sorting businesses. The method includes communicating a program postage rate to the mail senders, with instructions to apply the program rate to each mail piece and to fill one or more containers with mail pieces. The transport business receives the filled containers and gathers the containers into one or more pools at one or more holding facilities for later distribution to the pre-sorting business.

In one embodiment, the transport business receives a transport fee from each mail sender in exchange for collecting and transporting the container, regardless of the number of mail pieces inside the container. The transport fee is either a flat fee or a variable fee based on the weight of the container. In either case, the number of mail pieces inside the container need not be counted.

The transport business may transport the pools of containers to the mail pre-sorting business or, alternatively, the mail pre-sorting business may collect the pools.

In one embodiment, the transport business sets the program rate to be applied to each mail piece. The transport business may provide empty containers to the senders. The containers may be pre-addressed to a particular holding facility. The transport business may also receive requests from senders to participate.

In another aspect of this method, the transport business receives a transporter rebate from the mail pre-sorting business in exchange for the pools of containers gathered by the transport business.

In another aspect of the invention, a mail pre-sorting business accomplishes a method of collecting mail pieces from a plurality of mail senders. The method includes entering into an agreement to pay a transporter rebate to a transport business in exchange for the pools of containers gathered by the transport business. Under the agreement, the pre-sorting business receives the pools of containers and pays the transport business a transporter rebate which, in one embodiment, is an agreed upon portion of the rebate earned from a postal service by pre-sorting the pooled batch of mail.

In one embodiment, where each mail piece is metered at a program rate by the sender, the method includes opening the containers, sorting the mail pieces into a pre-sorted batch, preparing a certificate or manifest, tendering the batch to a postal service, and receiving a rebate from the postal service which represents the difference between the entry rate and the program rate, times the number of mail pieces in the pre-sorted batch. The method may include commingling the mail pieces before sorting. The rebate, preferably, is greater than the transporter rebate.

In one alternative embodiment, the pre-sorting business also applies the program rate of postage to each mail piece after opening each container. The pre-sorting business receives a fee from each sender, for each container, in the amount of the cost of the postage applied to each mail piece plus an additional fee.

In another aspect of the invention, a system for financing the collection, pooling, and processing of mail pieces into a pre-sorted batch includes a program rate of postage, a transport fee, a transporter rebate, a rebate, and one or more agreements between and among the senders, the transport business, and the mail pre-sorting business.

The program rate of postage is applied to each mail piece by the sender. Preferably, the program rate is less than the full rate of postage for unsorted mail, but greater than the entry rate expected to be earned by pre-sorting.

The transport fee is paid by each senders to a transport business in exchange for shipping a container filled with mail pieces. The transport fee may be a flat fee or a variable fee based on the weight of the container. Preferably, the number of mail pieces inside the container need not be counted.

The transporter rebate is paid by the mail pre-sorting business to the transport business in exchange for the pools of containers gathered by the transport business.

The rebate is paid by the postal service to the pre-sorting business in exchange for tendering a pre-sorted batch of mail sorted according to postal regulations. The rebate represents the difference between the entry rate and the program rate, times the number of mail pieces in the batch. Preferably, the rebate is greater than the transporter rebate.

In a preferred embodiment, the program cost to the sender is less than the cost of applying the full postage rate to each mail piece. The program cost includes the program rate times the number of mail pieces, plus the transport fee.

In another aspect, the present invention creates a cooperative of mail senders, transport businesses, and mail pre-sorting businesses, working together to pool small batches of unsorted mail into one or more larger, pre-sorted batches for mailing at a reduced entry rate of postage. The cooperative is bound by one or more agreements between and among the participants.

In one embodiment, the agreement provides that each sender may apply a program postage rate to each mail piece, fill a container with mail pieces, and pay a transport fee to the transport business in exchange for collecting the container.

In another aspect of one embodiment, the agreement provides that the transport business may receive requests from senders who want to join the cooperative, provide a plurality of empty and pre-addressed containers to each sender, establish the program rate based upon operating conditions, communicate the program rate to each sender, receive a transport fee from each sender for each container collected, and receive a transporter rebate from the pre-sorting business in exchange for the collection of the containers into one or more pools.

In another aspect of one embodiment, the agreement provides that the mail pre-sorting business may open the containers within each pool, commingle the mail pieces, sort the mail pieces into a pre-sorted batch, prepare a document certifying to the postal service that the pre-sorted batch is qualified for mailing at an entry rate, tender the pre-sorted batch to the postal service, receive a rebate from the postal service in an amount that reflects the difference between the entry rate and the program rate, and pay a transporter rebate to the transport business.

In another aspect of the invention, the method of processing medium-sized batches of mail into a larger batch suitable for pre-sorting includes the steps of establishing one or more holding facilities and establishing a mail pre-sorting facility separate from the postal service facility. The method further includes monitoring the size of incoming batches of mail and identifying medium-sized batches. The mail pieces may bear a program postage rate. The medium-sized batches are diverted into one or more containers, which are transported to one of the holding facilities, where the containers are gathered into one or more pools.

A medium-sized batch is generally defined by a lower limit and an upper limit. The lower limit depends in part upon the total sorting load at the postal service facility on a particular day. The upper limit depends in part upon the sorting capacity and the total sorting load at the mail pre-sorting facility on a particular day.

When a pool includes enough mail pieces to be accepted for pre-sorting, the method of the present invention further includes transporting the pool to a mail pre-sorting facility, where it is sorted into a pre-sorted batch suitable for mailing at an entry rate of postage.

In another aspect of the present invention, medium-sized batches of unsorted mail pieces are pooled into a larger pre-sorted batch for delivery to a postal service. In this aspect, the mail preparation system includes one or more holding facilities and a private mail pre-sorting facility. The method of processing medium-sized batches includes the steps of monitoring the size of incoming batches of mail and identifying medium-sized batches. The mail pieces may bear a program postage rate. The medium-sized batches are diverted into one or more containers, which are transported to one of the holding facilities, where the containers are gathered into one or more pools.

The method of the present invention further includes transporting the pool to a mail pre-sorting facility, where it is sorted into a pre-sorted batch suitable for mailing at an entry rate of postage. The postal service pays a rebate to the pre-sorting business. The rebate per mail piece represents the difference between said entry rate and said program rate.

In another aspect of the invention, a transport business accomplishes a method of supplying medium-sized batches of unsorted mail pieces to one or more mail pre-sorting businesses. The method includes receiving requests from mail senders, distributing empty containers to the senders, and then collecting and transporting the containers to one or more of the holding facilities. At the holding facility, the filled containers are gathered into one or more pools for later distribution to the pre-sorting business.

The method may further include communicating a program postage rate to the mail senders, with instructions to apply the program rate to each mail piece.

In one embodiment, the transport business receives a transport fee from each mail sender in exchange for collecting and transporting the container.

In another aspect of this method, the transport business receives a transporter rebate from the mail pre-sorting business in exchange for the pools of containers gathered by the transport business.

In another aspect of the invention, a mail pre-sorting business accomplishes a method of collecting mail pieces from a plurality of mail senders. The method includes receiving the pools of containers, opening the containers, sorting the mail pieces into a pre-sorted batch, and tendering the pre-sorted batch to the postal service facility for mailing at an entry rate of postage. The method may further include commingling the mail pieces with others. The method may also include preparing a certificate or manifest certifying that the pre-sorted batch is qualified for mailing at the entry rate.

In one embodiment, where a program postage rate is applied to each mail piece by the sender, the method further includes receiving a rebate from the postal service which represents the difference between the entry rate and the program rate, times the number of mail pieces in the pre-sorted batch.

Thus, it is an object of the present invention to solve the technical problems experienced by the postal service caused by the burden of sorting medium-sized batches of mail.

It is a related object of the present invention to reduce the burden on the postal service when mail volume increases using a method of identifying, diverting, and pooling together medium-sized batches for processing by a separate mail pre-sorting facility.

It is a further object of the present invention to provide a method of processing mail that fosters participation by mail senders who only need pre-sorting occasionally. It is a related object of the present invention to provide a solution that allows mail senders to take advantage of published or negotiated postage rates without requiring extensive and ongoing familiarity with local customs and practices.

Additionally, it is an object of the present invention to provide a method and system of processing mail pieces for low-volume mail senders that earns a reduced postage rate without incurring the high costs associated with pre-sorting relatively small batches of mail.

It is a further object of the present invention to provide a method and system for enabling low-volume mail senders to participate in the discounted-rate mail system of the local postal service. It is a related object of the present invention to facilitate the participation of low-volume mail senders in the services offered by mail pre-sorting facilities.

It is also an object of the present invention to provide an economical system for financing the pooling and processing of mail which is based in part on the postal service rebate earned by pre-sorting. It is a related object of the present invention to use the effective rate savings to drive the system and thereby enable low-volume mail senders to reap the benefits of pre-sorting that were otherwise available only to high-volume mail senders.

Additionally, it is an object of the present invention to solve the technical problems experienced by the postal service caused by the burden of sorting medium-sized batches of mail.

It is a related object of the present invention to reduce the burden on the postal service when mail volume increases using a method of identifying, diverting, and pooling together medium-sized batches for processing by a separate mail pre-sorting facility.

It is a further object of the present invention to provide a method of processing mail that fosters participation by mail senders who only need pre-sorting occasionally. It is a related object of the present invention to provide a solution that allows mail senders to take advantage of published or negotiated postage rates without requiring extensive and ongoing familiarity with local customs and practices.

These and other objects accomplished by the present invention will become apparent from the following detailed description of one preferred embodiment in conjunction with the accompanying drawings.

DETAILED DESCRIPTOIN OF THE DRAWINGS

Figure 1:
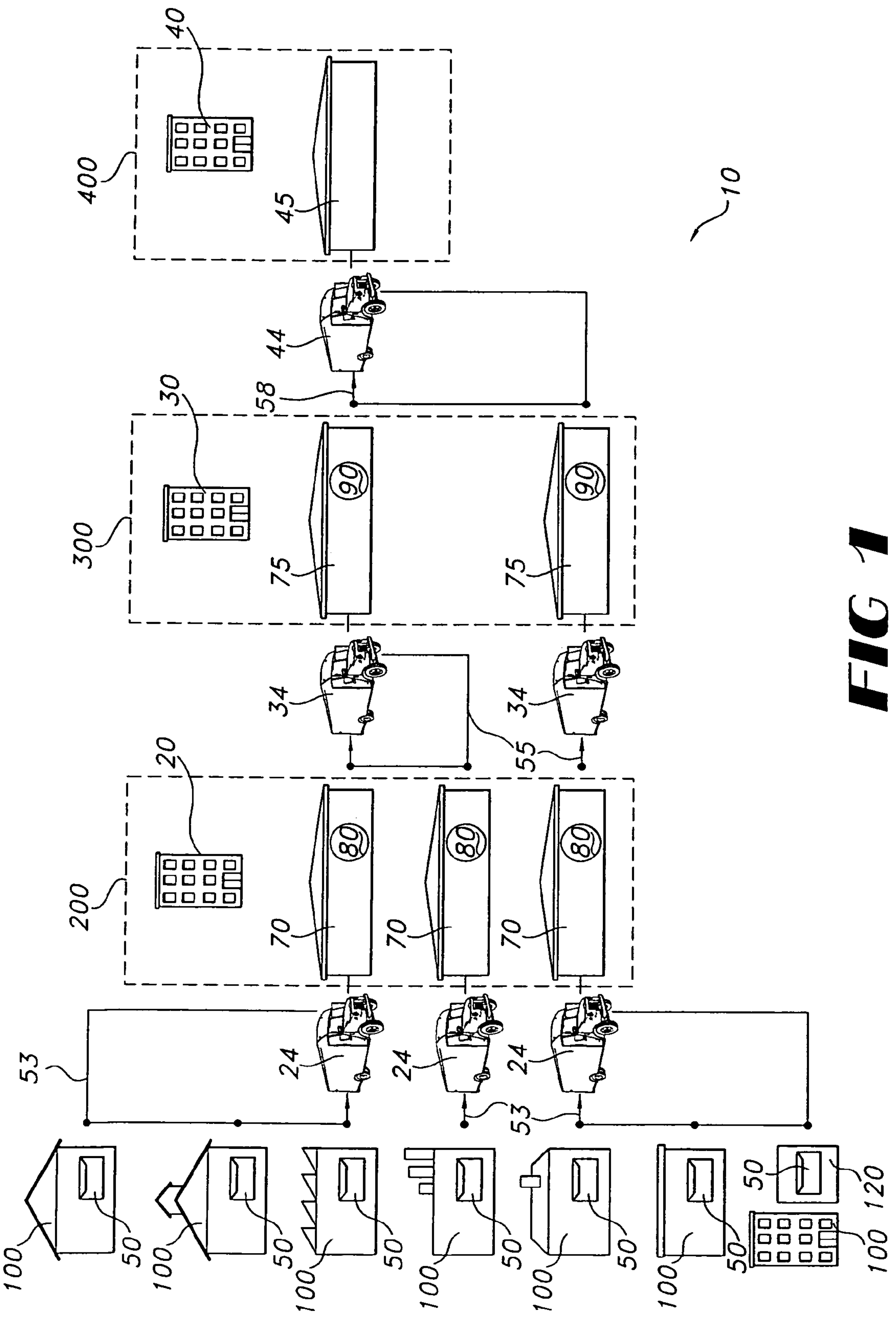
FIG. 1 depicts the flow of mail pieces according to an embodiment of the present invention.

Referring now in more detail to the drawings, in which like numerals indicate like elements throughout the several views, FIG. 1 is a flowchart illustrating the flow of mail according to an embodiment of the present invention.

The system 10 contemplates participation by a plurality of mail senders 100, a transport business 200, one or more pre-sorting businesses 300, and a postal service 400. The flowchart in FIG. 1 is generally divided into four columns, each containing the facilities of the four participants in the system 10. The mail processing generally proceeds from left to right.

FIG. 1 depicts a variety of mail senders 100, including without limitation individual consumers, small or large businesses, and small or large organizations. One type of mail sender 100 who may benefit from participation in the system 10 typically has a batch of mail that is too small to be accepted for processing by a mail pre-sorting business 300. Many mail pre-sorting businesses 300 only serve senders 100 who have large batches of mail; for example, greater than two thousand pieces. A mail sender 100 with a substantial batch of mail, such as fifteen hundred pieces, may benefit from participation in the system 10 because such a batch is too large for the sender 100 to pre-sort in an economically feasible manner. Also, such a batch is generally too large for collection by a mail carrier from the postal service 400, so the sender 100 must transport the sorted batch to a postal service facility 45. Faced with this dilemma, many mail senders 100 choose to stamp the unsorted mail at the first-class or full postage rate and then transport the stamped batch to a postal office 40 for delivery. The system 10 of the present invention offers an easy and cost-effective alternative.

A batch of unsorted mail pieces 95 may be described as a medium-sized batch because it is too small by itself for pre-sorting, yet too large for economical handling by the sender 100. A medium-sized batch of unsorted mail pieces 95 can be described as having a quantity between a lower limit and an upper limit. The lower limit depends in part upon the sorting load experienced on a particular mailing day. For example, on a high load day, a postal service 400 may find it efficient to divert batches of as few as two hundred pieces for pre-sorting elsewhere, whereas batches as high as one thousand pieces might be pre-sorted at the postal facility 45 when the load is low. The upper limit generally depends in part upon the capacity of the mail pre-sorting facility 75 and upon the number of mail pieces required for acceptance by a mail pre-sorting business 300. If, for example, the batch must contain at least two thousand pieces before a mail pre-sorting business 300 will accept it for pre-sorting, then batches below this upper limit may be diverted and pooled with other such batches until the pool contains a sufficient quantity of mail pieces to be accepted for pre-sorting.

The Flow of Mail

Broadly described, each participating sender 100 places unsorted mail into a container 50. The containers 50 are collected and transported to a holding facility 70, where the containers 50 are gathered into one or more pools 80. The pools 80 are then collected and transported to a mail pre-sorting facility 75, where the pools 80 are commingled and sorted into one or more pre-sorted batches 90. The pre-sorted batches 90 are then transported to a postal facility 45 for delivery at a reduced postage rate without requiring a significant amount of further processing. Diversion of mail in this manner reduces the postal service's reliance upon its own mail sorting equipment and personnel.

The transport business 200 may include a transport office 20 and one or more holding facilities 70. In one embodiment, the holding facilities 70 are regional or local hubs of the transport business 200. In one alternative embodiment, the holding facilities 70 are part of the postal service 400. The holding facility 70 might also be a separate, independent entity, such as a temporary warehouse. When the transport business 200 or holding facility 70 is described in this application as receiving items, the act of receiving may include collecting and transporting.

The pre-sorting business 300 may include a pre-sorting office 30 and a plurality of regional and local pre-sorting facilities 75. In one embodiment, the pre-sorting business 300 may include one or more holding facilities 70 used in the system 10. When the pre-sorting business 300 is described in this application as receiving items, the act of receiving may include collecting and transporting. In one alternative embodiment, the pre-sorting facility 75 is part of the postal service 400. Where the pre-sorting facility 75 is described as being separate from the postal service facility 45, it should be understood that the two facilities may reside in the same building or they may be physically separated. The concept of separation implies a division of the sorting tasks, not necessarily a division of the structure where such tasks are performed.

The postal service 400 generally includes a postal office 40 and a plurality of regional and local postal service facilities 45. Although one postal service facility 45 is shown in FIG. 1, it should be understood that the system 10 may include multiple postal service facilities 45. In one embodiment, the postal service 400 extends beyond the border shown in FIG. 1 to include one or more mail pre-sorting facilities 75 and one or more holding facilities 70. It should be understood that various government postal services 400 include a variety of systems and facilities that may be adapted to operate according to the system 10 of the present invention.

In one embodiment of the present invention, the transport business 200 monitors and administers the inventive system 10 in a way that ensures a profitable and economical result for each participant.

Transportation

The transportation steps between and among the facilities in the system 10 include, from left to right on FIG. 1, container transport 53, pool transport 55, and batch transport 58. Container transport 53 includes the collection and shipment of containers 50 from senders 100 to one or more holding facilities 70 via one or more container transport vehicles 24. Pool transport 55 includes the collection and shipment of pools 80 from holding facilities 70 to one or more pre-sorting facilities 75 via one or more pool transport vehicles 34. Batch transport 58 includes the collection and shipment of pre-sorted batches 90 from mail pre-sorting facilities 75 to one or more postal service facilities 45 via one or more batch transport vehicles 44.

Container transport 53, in one embodiment, transfers containers 50 from a postal facility 45 to one or more holding facilities 70 after a medium-sized batch of unsorted mail has been identified and diverted.

In another embodiment, container transport 53 is accomplished by the transport business 200 in one embodiment of the present invention. The transport office 20 may dispatch a fleet of container transport vehicles 24 on a plurality of routes, some of which may include regular customers of the transport business 200. In one aspect, a participating sender 100 may submit a request 110 to the transport office 20 (see FIG. 3) to pickup one or more containers 50. In another aspect, a participating sender 100 may drop a container 50 at a designated location 120 such as a retail mailing center or a drop box, where containers 50 may be routinely collected at a regular time by a container transport vehicle 24.

Pool transport 55, in one embodiment, is accomplished by the mail pre-sorting business 300. Pool transport 55, however, may be accomplished by the transport business 200, by another carrier, or by a combination of these, depending upon the number, location, and size of the pools 80 to be collected for processing. It should be understood that multiple pre-sorting businesses 300 may participate in the system 10 of the present invention.

Batch transport 58, in one embodiment, is accomplished by the mail pre-sorting business 300. The postal service 400, however, or another carrier may accomplish the batch transport 58 step. The number, location, and size of the pre-sorted batches 90 to be collected may affect the participants in the batch transport 58 step.

It should be understood that the example routes shown for the transport steps 53, 55, 58 in FIG. 1 are simplified for clarity. The number and variety of mail senders 100 is only limited by the extent to which the senders 100 may benefit from participating in the system 10. The container transport 53 step may include multiple hubs, intermediate stops, transfer points, and a variety of vehicles in order to transport the containers 50 to the most appropriate holding facility 70. Similarly, the pool transport 55 and batch transport 58 steps may take place in a hub-and-spoke arrangement of facilities and transfer points not shown in FIG. 1. Moreover, almost any kind of transportation device, including without limitation trucks, package cars, aircraft, and rail systems, may be used as a transport vehicle 24, 34, 44 within the system 10 of the present invention.

Preferably, every step of the described method and system 10 is completed within a twenty-four-hour period. In addition to the economic benefits of the present invention, the mail sender 100 may receive same-day processing and transportation of the mail pieces to the postal service 400.

Processing

Figure 2:
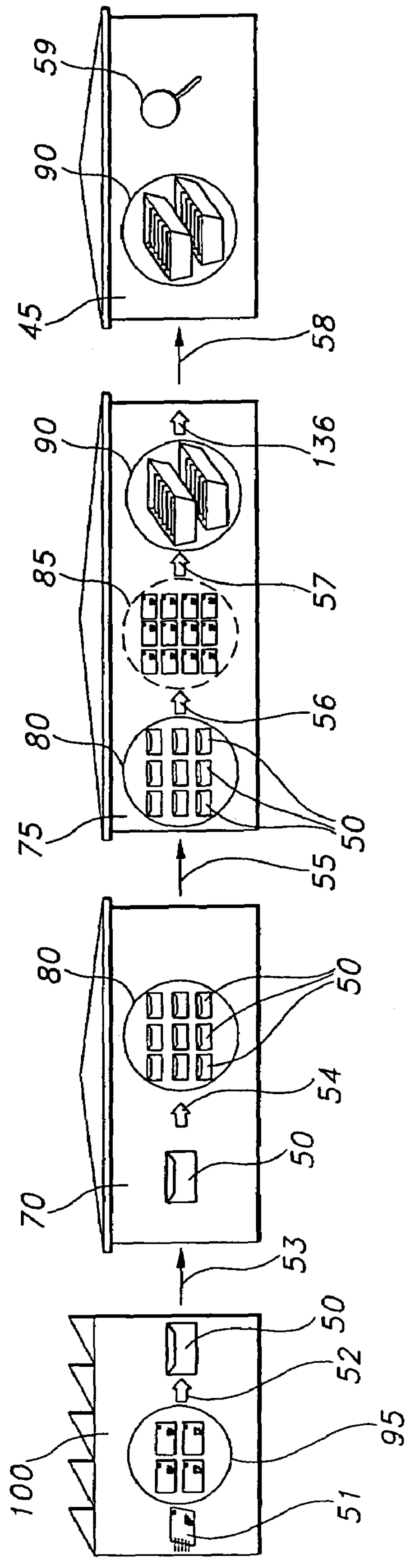
FIG. 2 shows the handling and processing of mail pieces in detail, according to an embodiment of the present invention.

FIG. 2 is a detailed view of the mail processing steps depicted more generally in FIG. 1. From left to right, FIG. 2 shows a sender 100, a holding facility 70, a mail pre-sorting facility 75, and a postal service facility 45. The discrete mail processing steps are depicted inside each facility. Also, the transport steps 53, 55, 58 are indicated generally between the facilities.

Sender Tasks

In one aspect of the present invention, each sender 100 may use a postage machine to meter 51 postage onto each mail piece. It should be understood that the decimalization (including tenths of a cent) of reduced postal rates established by the postal service 400 typically requires the sender 100 to use a postage machine instead of a stamp for applying postage to each mail piece. The sender might also obtain a postage label electronically. The term "meter" as used herein includes any and all methods of applying postage to a mail piece. Generally, the unsorted mail pieces 95 are metered 51 at a program rate 60 (see FIG. 3). The program postage rate 60, in some cases, may be the same as the first-class or full postage rate 64. The sender 100 then fills 52 a container 50 with the unsorted mail pieces 95.

In one alternative embodiment, the sender 100 applies no postage before filling 52 the container 50 with the unsorted mail pieces 95. The step of metering 51 the program rate 60 onto each mail piece is performed by the pre-sorting business 300, after which the cost of the postage applied (plus an additional fee, perhaps) is charged to the sender 100. Although this alternative requires an additional billing step, it relieves the sender 100 of the burden of purchasing or leasing and maintaining a postage machine and eliminates the task of metering 51 postage onto each mail piece 95.

In another aspect of the present invention, each container 50 may be pre-addressed to a particular holding facility 70. In one embodiment, the transport business 200 may provide a plurality of empty containers 50 to one or more participating mail senders 100. The containers 50 may be durable and suitable for repeated uses.

Each container 50 may be encoded for tracking purposes in a manner known to those skilled in the art. The tracking system may include scanning the unique code on each container 50 at key checkpoints along the way and may further include making such information available to the mail senders 100, thereby allowing the sender 100 to follow the progress of each container 50.

The tracking and scanning of the present invention enables the transport business 200 to monitor the progress of each container 50. If, for example, a delivery scan does not occur on the same day as an origin scan, an exception or fault notice will be generated. If and when such an exception is generated, the transport business 20 may immediately activate its exception solution function and track the container 50 to resolve the delay.

It should be noted that the steps of applying postage to the mail pieces and filling some type of container are tasks that, typically, are already performed by mail senders 100 who process mail in sufficient quantities to potentially earn a discounted postage rate.

In another aspect of the present invention, the system 10 operates efficiently and economically without the need to count the number of unsorted mail pieces 95 in each container 50. As will be understood, the transport fee 102 for shipping, preferably, is paid on a flat rate, per-container basis instead of on a per-mail-piece basis, thereby eliminating the need for the sender 100 or the transport business 200 to count mail pieces in order to calculate a fee.

In one alternative embodiment, the transport fee 102 is paid according to the weight of the container 50 instead of a flat rate. In this embodiment, the amount of the transport fee 102 would depend, in part, on the number of mail pieces 95 inside the container 50. Still, the task of counting the number of mail pieces 95 may be avoided when the transport fee 102 is paid on a by-weight basis.

The batch of unsorted mail pieces 95 is described herein as being "unqualified" because it does not qualify for a discount, if any, offered by the postal service 400 for pre-sorted mail. A completely unsorted batch of mail, of course, would not qualify as pre-sorted mail. It should be understood, however, that a batch of mail may be sorted to some degree, but still not qualify as a pre-sorted batch under the regulations of the postal service 400. Hence, the term unqualified as used herein includes partially sorted batches of mail.

The container transport 53 step moves the container 50 from the sender 100 to a holding facility 70.

Holding Facility Tasks

In another aspect of the present invention, the collected containers 50 are gathered or pooled 54 into a pool 80 at a holding facility 70. In one embodiment, where the holding facility 70 is part of the transport business 200, the transport business pools 54 the containers 50. The pool 80 is held in a designated location for later pickup and transport. The pool 80 may be held on a particular loading dock at the holding facility 70 or, in some cases, at the mail pre-sorting facility 75. Preferably, the containers 50 are not opened during the pooling 54 step.

The act of pooling 54 may be as simple as putting the containers 50 in a designated bin, or as elaborate as queuing the containers 50 in a staging area into different pools 80 for pickup by certain pool transport vehicles 34 (shown in FIG. 1). The pool transport 55 step moves the pools 80 from the holding facility 70 to a mail pre-sorting facility 75.

It should be noted that the containers 50 collected from a plurality of mail senders 100 participating on a given day may contain different types of mail pieces. For example, the mail pieces 95 in a certain container 50 may be unsorted or partially sorted. The container 50 may contain many mail pieces 95 or relatively few. Thus, the plurality of containers 50 received at a holding facility 70 may include an unknown quantity of mail pieces 95 in an unknown or mixed sort condition.

Pre-Sorting Tasks

In another aspect of the present invention, the pre-sorting facility 75 opens the containers 50 and commingles 56 the mail pieces therein. The commingled mail pieces 85 are then pre-sorted 57 into a pre-sorted batch 90.

In one embodiment, the act of commingling 56 occurs when the container 50 is opened and the unsorted mail pieces 95 are placed into the machine for pre-sorting 57. The commingling 56 may or may not result in a mixing of unsorted mail pieces 95 from the system 10 of the present invention with mail pieces from senders who did not participate in the system 10. The act of commingling 56 as contemplated by the system 10 of the present invention generally includes the integration of unsorted mail pieces 95 from disparate senders 100 into the batch-by-batch mail pre-sorting system typically performed by a mail pre-sorting business 300. In certain systems, for example, the mixing of mail pieces may occur in the ordinary manner, by filling a bin or hopper with the unsorted mail pieces 95. In other systems, however, the physical mixing of mail pieces may occur only during an ongoing pre-sorting process 57. In other words, the steps of commingling 56 and pre-sorting 57 may occur simultaneously instead of as discrete tasks. In either instance, the commingling 56 occurs when the unsorted mail pieces 95 are incorporated into the system used by the particular mail pre-sorting business 300.

In another aspect of the present invention, the pre-sorting facility 300, at some place and time, officially tenders 136 the pre-sorted batch 90 to the postal service 400. The official tender 136 may take place, for example, on the loading dock at the pre-sorting facility 75 if the postal service 400 has sent a batch transport vehicle 44 to collect the batch 90. On the other hand, the tender 136 may occur at the loading dock of the postal service 400 if the pre-sorting facility 75 delivers the batch 90. Hence, the act of tendering 136 may include a transporting the batch 90. Although the tender 136 is shown taking place inside the mail pre-sorting facility 75 in FIG. 3, it should be understood that the tender 136 may occur at any location. In any event, the participating mail sender 100 is relieved of the step of transporting its mail pieces and tendering the batch to the local postal service facility 45. The burden of transporting a relatively small batch of mail is another one of the administrative tasks that a mail sender 100 need not perform if it participates in the inventive system 10.

Figure 3:
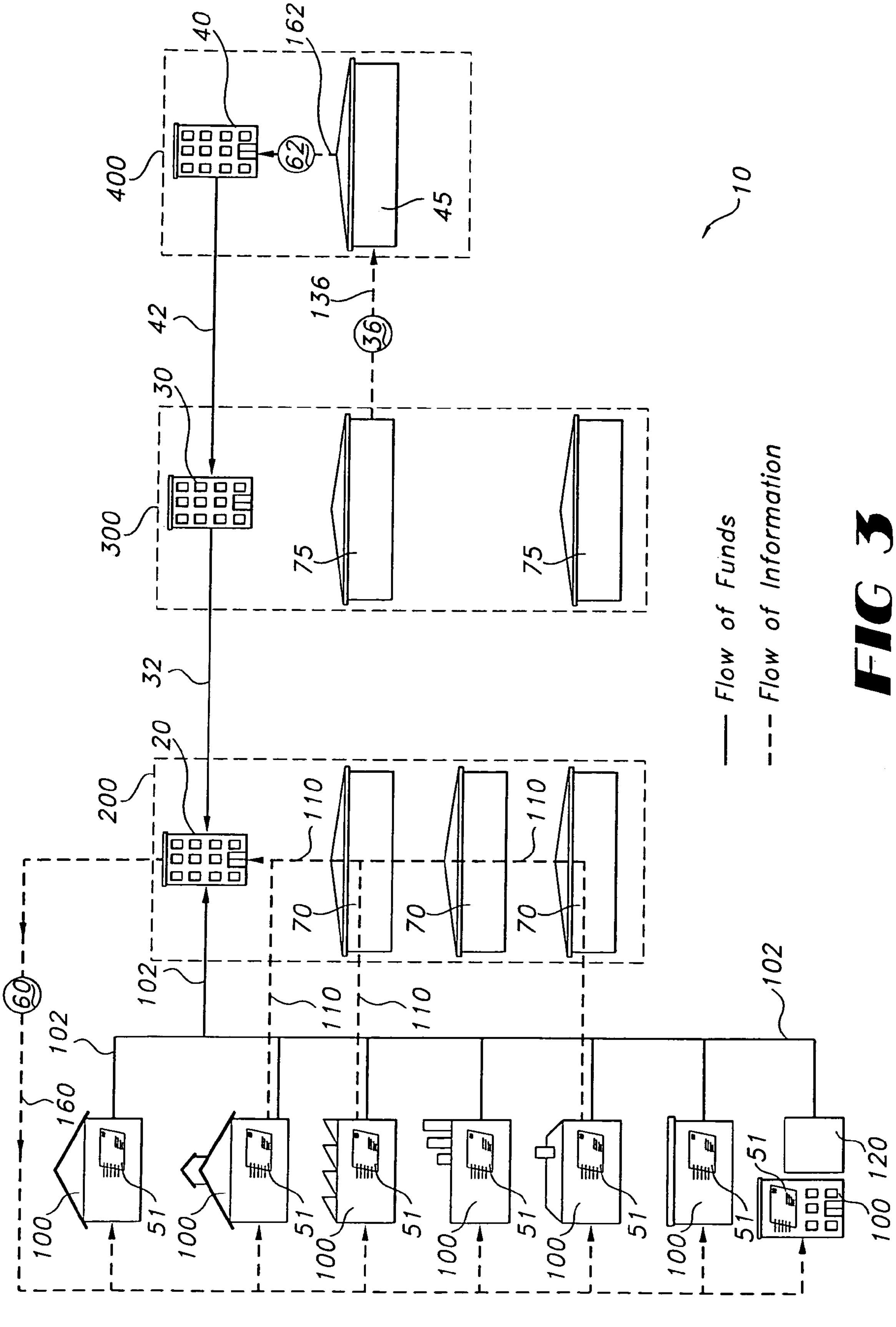
FIG. 3 depicts the flow of funds and information between and among the participating entities, according to an embodiment of the present invention.

In a related aspect of the invention, the tender 136 of the batch 90 is typically accompanied by a sorting certificate 36 (see FIG. 3). Depending upon the postal regulations, the information required in a sorting certificate 36 may be contained in a manifest or in another shipping document describing the attributes of the pre-sorted batch 90 in sufficient detail. As used herein, the term "certificate" shall include a certificate, a manifest, or other documentation required to satisfy the regulations of the postal service 400. The certificate 36 must be in proper form to earn a rebate 42 (see FIGS. 3 and 4) from the postal service 400. The pre-sorting business 30 is already accustomed to and equipped for preparing certificates 36 in the most cost-effective way. The burden and complexity of preparing a proper certificate 36 is one of the administrative tasks that a mail sender 100 need not perform when it participates in the inventive system 10.

The batch transport 58 step moves the pre-sorted batches 90 from the mail pre-sorting facility 75 to the postal service facility 45.

Postal Service Tasks

In another aspect of the present invention, the postal service 400 receives the batch 90 when it is tendered 136 by the pre-sorting business 300. The batch 90 is then inspected 59 by the postal service 400 to determine the entry rate 62 (see FIG. 3) for the mail pieces contained within the batch 90. The step of inspecting 59 the batch 90 generally includes an examination of the certificate 36. The batch 90 is then readied for delivery to the individual addressees.

The pre-sorting 57 accomplished at the pre-sorting facility 75 reduces the processing burden placed upon the postal service 400.

The Postage Rates

Figure 4:
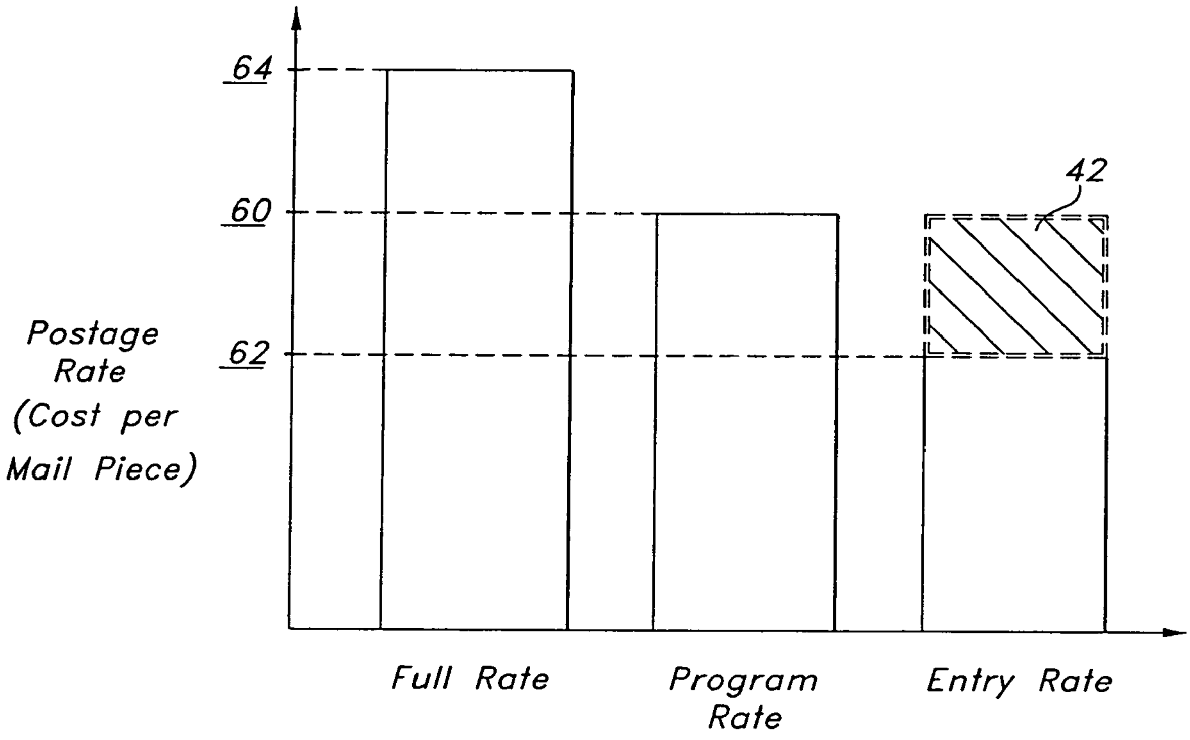
FIG. 4 is a graph showing the relative postage rates within the system, according to an embodiment of the present invention.

Referring briefly to the graph in FIG. 4, the economy of the system 10 of the present invention is driven, in part, by the reduced postage rates for pre-sorting offered by the postal service 400. The full postage rate 64 is for unsorted mail. The program postage rate 60 is applied by the sender 100 to each unsorted mail piece 95. Generally, the program rate 60 is somewhat less than the full rate 64, providing a savings to program participants. The entry postage rate 62 is based upon the degree of pre-sorting accomplished, as established by the postal regulations and as detailed in the sorting certificate 36.

As an example, the full rate 64 for unsorted first-class mail may be 34.0 cents, the program rate 60 may be set at 32.2 cents, and the entry rate 62 earned by pre-sorting may be 28.0 cents per mail piece.

The entry rate 62 secures an immediate rebate 42 for the mail pre-sorting business 300, in exchange for the degree of sorting accomplished. The rebate 42 per mail piece generally represents the difference between the program rate 60 (which has already been metered 51 onto each mail piece 95 by the sender 100 or by another participant in the system 10) and the entry rate 62.

In one embodiment where the postal service 400 may not offer reduced postage rates for pre-sorting, the economy of the system 10 of the present invention is realized through the reduced demand placed upon the mail sorting machinery and personnel at the postal service facility 45. The reduced demand manifests itself in a variety of ways, such as reduced wear and tear on postal equipment, less need for additional postal sorting equipment, and fewer employees needed for manual sorting tasks. By reducing the burden on the postal service 400, the solution offered by the system 10 of the present invention helps reduce the expense and delay caused by increased sorting loads.

The Flow of Information and Funds

FIG. 3 is similar in form and outline to FIG. 1. The dotted lines represent the flow of information and the solid lines represent the flow of funds in the system 10 of the present invention.

In one aspect, the system 10 of the present invention may begin with a request 110 from a mail sender 100 who wants to participate in the system 10. The request 110 may be directed toward the transport business 200 which, in one embodiment, acts as the administrator of the system 10. Alternatively, the request 110 may be directed toward the postal service 400 which administers the system 10 sorting and selects batches of unsorted mail pieces 95 to be diverted for pre-sorting.

A request 110, however, is not always necessary or required. Certain mail senders 100 may participate on a standing daily or other periodic basis. Other senders 100 may prepare a container 50 for pickup on a day when other parcels are being collected by the transport business 200, making a request 110 unnecessary or redundant. Still other senders 100 may transport a container 50 to a designated location 120 such as a retail mailing center or a drop box, eliminating the need for a specific request 110.

In another aspect of the present invention, the administrator of the system 10 may notify 160 the participating senders 100 of the program postage rate 60 to be metered 51 onto each unsorted mail piece 95. Setting the program rate 60 may include an analysis of a variety of system factors, including the number of senders 100, the expected contents of the pools 80 for a given day, the location and number of holding facilities 70 required to handle the volume, the location and number of pre-sorting facilities 75 required to pre-sort the mail pieces, and the location and number of postal service facilities 45 where the pre-sorted batches 90 will be received for delivery. In a stable operating environment, the program rate 60 may remain generally constant. The program rate 60, however, may range from zero cents (unstamped) to the full rate 64, depending upon conditions within the system 10.

The task of metering 51 is included in FIG. 3 as a step in the flow of funds because the mail sender 100 is applying postage at a cost equal to the program rate 60 to each mail piece. Metering 51 is the first step, in one embodiment, in the flow of funds in the system 10 of the present invention.

In one alternative embodiment, described above but not shown in FIG. 3, metering 51 is a later step, performed by the pre-sorting business 300 when the pool 80 is received. In this embodiment, the pre-sorting business 300 opens each container 50 when it is received at the pre-sorting facility 75 and meters 51 the program rate 60 onto each mail piece 95. This embodiment requires counting the number of mail pieces 95 in each container 50 because the cost of the postage applied (specifically, the program rate 60 times the number of mail pieces 95) must be charged to the sender 100. The total metering charge billed to the sender 100 may also include a handling fee to compensate the pre-sorting business 300 for accomplishing the task of metering 51 each piece 95.

The Transport Fee 102

In another economic aspect of the system 10, each sender 100 pays a transport fee 102 to the transport business 200, preferably to a transport business office 20, in exchange for the collection and transportation of each container 50 to the holding facility 70. In one embodiment, the transport fee 102 includes not only the fee for the container transport 24 but also compensates the transport business 200 for administering and monitoring the system 10. Preferably, the transport fee 102 is lower than the additional operating costs per piece that would be incurred to accomplish the pre-sorting of unqualified mail pieces 95 by the sender 100 internally.

Preferably, the transport fee 102 is not based on the number of unsorted mail pieces 95 in each container 50, thereby eliminating the need for any participant to count the mail pieces 95. In one embodiment, the transport fee 102 is paid on a flat rate, per-container basis, allowing the insertion of a maximum number of mail pieces 95 regardless of number or weight. In one alternative embodiment, the transport fee 102 is paid according to the weight of the container 50, allowing the economical transport of smaller, lightweight batches of unsorted mail pieces 95.

The Entry Rate 62 and The Rebate 42

In another aspect of the invention, the pre-sorted batch 90 is officially tendered 136 to the postal service facility 45, as described above, along with the sorting certificate 36. The information contained in the certificate 36 allows the postal service 400 to determine the entry rate 62 for the mail pieces contained in the pre-sorted batch 90. The entry rate 62 is based upon the degree of pre-sorting accomplished.

In another aspect of the information flow of the system 10, the postal facility 45 reports 162 the entry rate 62 to a postal office 40. The entry rate 62 is used by the postal office 40 to establish the rebate 42. It should be understood, however, that the act of reporting 162 the entry rate 62 may occur immediately upon the tender 136 and inspection 59 of the pre-sorted batch 90 (see FIG. 2), without a discrete step of communication between a postal facility 45 and a separate postal office 40.

In a related aspect of the flow of funds in the system 10, the mail pre-sorting business 30 receives a rebate 42 from the postal service 400. The rebate 42 generally represents the difference between the entry rate 62 and the metered program rate 60 on each mail piece, times the number of mail pieces. For example, the postal service regulations may allow mail pieces initially metered at a program rate 60 of 32.2 cents to be mailed at a entry rate 62 of 28.0 cents, resulting in a rebate 42 to the pre-sorting business 300 in the amount of 4.2 cents per mail piece.

In embodiments where the postal service 400 owns and operates the mail pre-sorting facility 75, the rebate 42 is realized not in cash but in the form of reduced demand placed upon the mail sorting machinery and personnel at the postal service facility 45. By reducing the burden on the postal service 400, the solution offered by the system 10 of the present invention helps reduce the expense of postage and reduce delays in mail delivery.

The Transporter Rebate 32

In one preferred embodiment, the mail pre-sorting business 300 pays a transporter rebate 32 to the transport business 200. The transporter rebate 32 may be thought of as a portion of the rebate 42 earned by the pre-sorting business. The terms and amount of the transporter rebate 32 are agreed upon between the transport business 200 and the pre-sorting business 300. For example, the transporter rebate 32 may be a flat fee tied to the number of pools 80 created, or it may be a per-piece fee based upon the number of mail pieces in the batch 90, or it may be a fixed percentage of the rebate 42 received from the postal service 400. In one embodiment, the transporter rebate 32 compensates the transport business 200 for accomplishing the container transport 53 step, for pooling 54 the containers 50 into a pool 80, and for administering and monitoring the system 10. The amount of the transporter rebate 32 is preferably larger than the amount of the rebate 42.

The rebate 42 paid by the postal service 400 is generally a per-piece rebate because the mail pieces 95 were initially metered at the program rate 60 by the sender 100. The transporter rebate 32, however, may be paid per-piece, as a flat rate, or as a percentage of the rebate 42, depending upon the agreement between the transport business 200 and the pre-sorting business 300.

In embodiments where the postal service 400 transports and pools 54 its own containers 50, the transporter rebate 32 is realized not in cash but in the form of reduced demand placed upon the mail sorting machinery and personnel at the postal service facility 45. The transporter rebate 32 can be seen in the reduced expenses of processing and in the delays avoided because of more efficient transportation and handling of medium-sized batches of mail.

Advantages

In one aspect of the present invention, the inventive system 10 creates a silent cooperative of participating mail senders 100 working together to earn a lower effective postage rate, while the senders 100 remain unidentified and unknown to one another. The invention, therefore, takes advantage of the power of a cooperative venture without the usual burden on its members of finding similarly-situated mail senders 100 with similar needs. Also, the participants may change from day to day, freely entering or exiting the cooperative without the barriers to entry sometimes present in more formalized cooperatives.

In another aspect, the system 10 of the present invention provides a participating mail pre-sorting business 300 with a source of large pools 80 of containers 50 filled with unsorted mail pieces 95. Because pre-sorting businesses 300 typically refuse lower-quantity batches of mail, the pooling of mail pieces 95 from a plurality of lower-volume senders 100 is a source of business not otherwise available to the mail pre-sorting business 300. By increasing the volume of mail to be pre-sorted, the pre-sorting business 300 increases its capacity to earn rebates 42 from the postal service 400.

It should be understood that a distinct advantage of the system 10 is that the amount of the rebate 42 is high enough to profitably fund the pre-sorting and the transportation, while also allowing the participating mail sender 100 to meter its unsorted mail pieces 95 at a reduced, program rate 60. The total program cost to the sender 100 of applying the program postage rate 60 to each mail piece 95 and paying the transport fee 102 is, preferably, less than the cost of applying the full rate 64 to each mail piece 95.

Preferably, the amount of the rebate 42 enables all the participants in the system to continue doing what they do best, without increased burdens or additional tasks. More specifically, the mail pre-sorting business 300 is already in the business of commingling and pre-sorting large quantities of mail. The transport business 200 is already in the business of collecting, tracking, and monitoring the delivery of containers. The mail sender 100, by participating in the system 10, is free to concentrate on its ongoing business rather than learning the complex pre-sorting regulations, preparing sorting certificates 36, and transporting small batches of mail to the postal service facility 45 every day.

By participating in the inventive system 10, the mail sender 100 may meter its mail at the lower program rate 60 without incurring additional operating costs, in exchange for the payment of the transport fee 102 to the transport business 200. In one preferred embodiment, the transport fee 102 is lower than the additional operating costs that would have been necessary to accomplish the pre-sorting internally. The sender's mail pieces become part of a larger commingled batch that is pre-sorted to a high level of classification, thereby facilitating quicker delivery, which is a benefit to mail recipients as well.

While the economics of the system 10 is in some cases driven by the rebate 42 earned for pre-sorting, in other embodiments, the intangible savings in equipment, human resources, and time are sufficient to allow any postal service 400 and any mail preparation system to benefit from the system 10 of the present invention.

The reduced program postage rate 60 provides an immediate savings for the sender 100 for each mail piece 95. In a related aspect of the present invention, the mail sender 100 need not count the number of mail pieces 95 being placed into each container 50 because, preferably, the transport fee 102 for shipping is paid on a per-container basis. This aspect of the preferred pricing structure, together with the reduced program postage rate 60 per piece, allows the sender 100 to offset the cost of the transport fee 102 against the savings (perpiece) provided by the program rate 60. For example, a relatively small difference between the full rate 64 and the program rate 60, such as 1.8 cents per mail piece, may offset a transport fee 102 of $8.00, for example, if the quantity of mail pieces is sufficiently large. A batch of eight hundred mail pieces, for example, at a gross savings of 1.8 cents per mail piece would yield a total savings of $14.40 which, offset against a transport fee of $8.00, would yield a net savings of $6.40.

In one alternative embodiment, the transport fee 102 is paid according to the weight of the container 50 instead of a flat rate. In this embodiment, the by-weight pricing structure allows the sender 100 to offset the cost of the transport fee 102 (per ounce, for example) against the savings (per piece) provided by the program rate 60. For example, a sender 100 has a very small batch of two hundred mail pieces 95. Using a gross savings of 1.8 cents per mail piece would yield a total savings of only $3.60, which would not fully offset a flat-rate transport fee 102 of $8.00. The alternative per-ounce transport fee 102, however, might be less than $3.60, resulting in a net savings for the sender 100 when sending a small batch.

The transport business 200, by participating in the inventive system 10, receives a transport fee 102 from the sender 100 and a transporter rebate 32 from the mail pre-sorting business 300. In one preferred embodiment, the fees earned by the transport business 200 provide a profit over and above the cost of collecting and pooling the containers 50 and, in one embodiment, administering the system 10. Furthermore, as a participant in the inventive system 10, the transport business 200 may establish a relationship with a plurality of participating mail senders 100 and develop good will for other services to be offered.

Thus, the present invention provides a comprehensive system 10 in which cooperating mail senders 100, service businesses 200, 300, and in some cases the postal service 400, may collect and pool mail pieces, earn a rebate 42 by commingling and sorting the mail pieces into a large, qualified, pre-sorted batch 90, and distribute the rebate 42 and/or the intangible savings among the participants in the system 10 according to agreed terms.

Thus, the present invention provides a system and method for facilitating the entry of low-volume mail senders 100 into the discounted-rate mail system of a postal service 400. For the mail sender 100, the inventive system 10 earns a lower postage rate, eliminates the sorting task, provides economical transportation of the unsorted mail pieces 95 in a standard container 50, allows tracking of each container 50, and accomplishes the delivery of pre-sorted mail to the postal service 400 within a twenty-four-hour period.

For the postal service 400 that establishes its own holding facilities 70 and/or pre-sorting facility 75, the inventive system 10 reduces reliance on the sorting apparatus and personnel at the main postal service facility 45, provides economical transportation of the unsorted mail pieces 95 in a standard container 50, diverts the sorting of medium-sized batches to a separate mail pre-sorting facility 75, and accomplishes the delivery of pre-sorted mail to the postal service 400 within a twenty-four-hour period.

While this invention has been described in specific detail with reference to the disclosed embodiments, it will be understood that many variations and modifications may be effected without departing from the invention as described in the appended claims.

What is claimed is:

1. A method of processing medium-sized batches of unsorted mail pieces into larger pre-sorted batches for mailing in a postal system on each day of a plurality of days, the postal system having one or more postal service facilities, one or more holding facilities, and one or more mail pre-sorting facilities separate from the one or more postal service facilities, said method characterized by the steps of:

establishing, on each particular day of the plurality of days, a lower limit of the medium-sized batches based at least in part upon a total sorting load at one of the postal service facilities on the particular day;

establishing, on each particular day of the plurality of days, an upper limit of the medium-sized batches based at least in part upon a capacity of one of the mail pre-sorting facilities and a number of mail pieces required for acceptance by said one of the mail pre-sorting facilities on said particular day;

monitoring size of batches of mail tendered by mail senders;

identifying said medium-sized batches of unsorted mail pieces, said medium-sized batches having a quantity between the lower limit and the upper limit, said mail pieces within said medium-sized batches bearing a program postage rate;

after the identifying step, diverting each of said identified medium-sized batches into one or more containers;

after the identifying step, transporting said containers to one of said holding facilities;

after the containers are transported to said one of the holding facilities, gathering said containers into one or more pools at said one of the holding facilities; and after the gathering step, transporting said pools to said one of the mail pre-sorting facilities for sorting into a pre-sorted batch and being sent to said one of the postal service facilities for being delivered by the postal service facility at an entry rate of postage.

2. The method of claim 1, wherein said entry rate is less than said program rate.

3. The method of claim 1, wherein said one of the mail pre-sorting facilities is owned and operated by a private mail pre-sorting business.

4. The method of claim 3, wherein said one of the postal service facilities pays a rebate to said pre-sorting business, said rebate representing the difference between said entry rate and said program rate.

5. A method of processing medium-sized batches of unsorted mail pieces into larger pre-sorted batches for delivery to a postal service in a mail preparation system on each day of a plurality of days, the mail preparation system including one or more holding facilities and one or more mail pre-sorting facilities separate from one or more postal service facilities wherein there are costs associated with participating in the mail preparation system, said method characterized by the steps of:

establishing, on each particular day of said plurality of days, an upper limit of said medium-sized batches based at least in part upon a minimum number of mail pieces per batch acceptable for processing at one of said mail pre-sorting facilities on the particular day;

establish a lower limit of said medium-sized batches based at least in part upon said costs associated with participating in the mail preparation system;

monitoring size of batches of mail tendered by a plurality of mail senders;

identifying said medium-sized batches of unsorted mail pieces, said medium-sized batches having a quantity between the lower limit and the upper limit, said mail pieces within said medium-sized batches bearing a program postage rate;

after the identifying step, diverting each of said identified medium-sized batches into one or more containers;

after the diverting step, transporting said containers to one of said holding facilities;

after the containers are transported to said one of the holding facilities, gathering said containers into one or more pools at said one of the holding facilities;

after the gathering step, transporting said pools to one of said mail pre-sorting facilities for sorting into a pre-sorted batch; and delivering said pre-sorted batch for mailing at an entry rate of postage to one of said postal service facilities.

6. The method of claim 5, wherein said entry rate is less than said program rate.

7. The method of claim 5, wherein said one of the postal service facilities pays a rebate to a pre-sorting business operating the pre-sorting facility to which the pools were transported, said rebate representing the difference between said entry rate and said program rate.

* * * * *